Oct. 18, 1932.  C. G. BOONE  1,883,509
PIPE UNION
Filed April 20, 1931
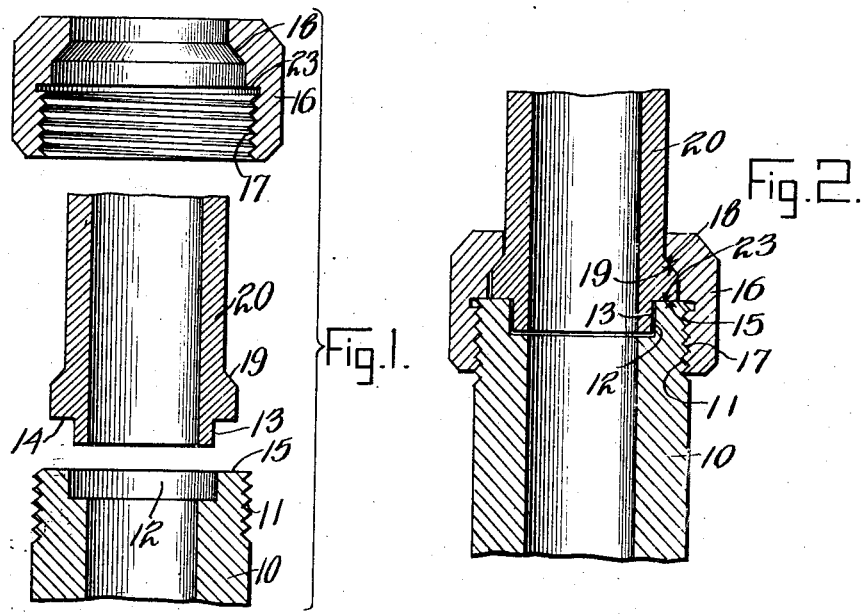
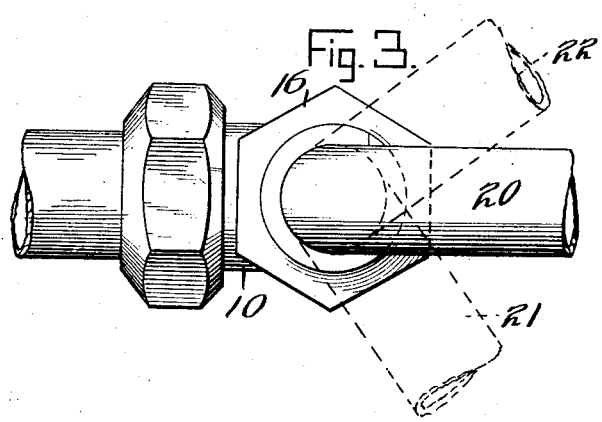
Inventor
Charles G. Boone
By
[signature]
Attorney Patented Oct. 18, 1932

UNITED STATES PATENT OFFICE

CHARLES G. BOONE, OF TULSA, OKLAHOMA, ASSIGNOR TO MAGIC CITY SPECIALTY COMPANY, OF TULSA, OKLAHOMA, A CORPORATION OF OKLAHOMA

PIPE UNION

Application filed April 20, 1931. Serial No. 531,570.

This invention relates to pipe joints and unions and an object of the invention is to provide an improved union which will insure a tight joint without the necessity of packing material and which will permit relative movement between the connected parts and will permit the necessary expansion and contraction due to changing temperatures without injury to the parts and without causing leaks.

Referring to the accompanying drawing, which is made a part hereof and on which similar reference characters indicate similar parts, Figure 1 is a section showing the several elements of the union, the elements being separated, Figure 2, a similar section with the elements shown joined together, and Figure 3, a plan view of a pair of unions constituting an elbow connection.

My union consists of only three parts. For the purpose of description one will be termed a stationary part, one a movable part, and one a securing part. The stationary part 10 is provided with threads 11 and with an inner shoulder 12 in which a corresponding portion 13 of the movable part 20 fits. The end of the portion 20 has a shoulder formed at 14 to fit on the surface 15. A securing nut 16 is provided with interior screw threads 17 which engage the threads 11. The nut 16 has a bevel edge 18 which fits a corresponding bevel edge 19 on the member 20 and a surface 23 which seats on surface 15 on element 10. In the preparation of the parts of the union the surfaces 15, 14, 18, 19 and 23 are all finished by grinding so that these provide accurate seating surfaces when the elements are assembled as shown in Figure 2. This insures a perfectly fluid-tight joint. When assembled as shown in Figure 2 the element 20 may freely rotate without loosening the cap 16 or without permitting the fluid to leak between the adjacent surfaces. When forming the parts of an elbow joint as shown in plan view in Figure 3 the element 20 may be swung to either of the dotted line positions shown at 21 or 22. This permits great flexibility of the joint. When pressure is applied in the line, any expansion of element 20 will tend to increase the seal at surfaces 18 and 19. This will also be true of any expansion due to temperature. Any increase in temperature will also increase the sealing effect at surfaces 14 and 15.

It will be obvious to those skilled in the art that various changes may be made in my device without departing from the spirit of the invention and therefore I do not limit myself to what is shown in the drawing and described in the specification, but only as indicated by the appended claim.

Having thus fully described my said invention, what I claim as new and desire to secure by Letters Patent, is:

A pipe coupling union comprising a stationary part provided with an inner shoulder, a movable part having a projection at one end adapted to be enclosed by said shoulder, a flange formed adjacent said projection perpendicular thereto adapted to seat on the end of said stationary part and of a diameter less than that of the said stationary part, the upper portion of said flange being beveled and a securing part mounted around said movable part having a corresponding bevel therein conforming and seated on said bevel on the flange, and a shoulder adjacent to said bevel adapted to seat on the end of said pipe over said flange, said securing part being screw-threaded on said stationary part, all contacting surfaces being ground finished, substantially as set forth.

In witness whereof, I have hereunto set my hand at Tulsa, Oklahoma, this thirteenth day of April, A. D. nineteen hundred and thirty-one.

CHARLES G. BOONE.